Oct. 27, 1964 J. F. ARMSTRONG Re. 25,672

FUEL INJECTION SYSTEM

Original Filed Jan. 7, 1957 3 Sheets-Sheet 1

INVENTOR.
JAMES FRED ARMSTRONG
BY Bertram H. Manes
ATTORNEY

FUEL INJECTION SYSTEM

Original Filed Jan. 7, 1957 3 Sheets-Sheet 2

INVENTOR.
JAMES FRED ARMSTRONG
BY Bertram H. Mann
ATTORNEY

FUEL INJECTION SYSTEM

Original Filed Jan. 7, 1957 3 Sheets-Sheet 3

INVENTOR.
JAMES FRED ARMSTRONG
BY Bertram H. Max
ATTORNEY

United States Patent Office

Re. 25,672
Reissued Oct. 27, 1964

25,672
FUEL INJECTION SYSTEM

James F. Armstrong, Kirkwood, Mo., assignor to ACF Industries, Incorporated, New York, N.Y., a corporation of New Jersey Original No. 3,029,800, dated Apr. 17, 1962, Ser. No. 632,798, Jan. 7, 1957. Application for reissue July 31, 1962, Ser. No. 214,796
16 Claims. (Cl. 123—119)

Matter enclosed in heavy brackets [ ] appears in the original patent but forms no part of this reissue specification; matter printed in italics indicates the additions made by reissue.

This invention is an engine charging device using the continuous flow system adapted for port injection, in which system the fuel is pressurized, measured under pressure in accordance with engine requirements, and distributed under pressure to points adjacent the intake valves of the several cylinders or combustion chambers of the engine. Such a system is shown in my prior application, Serial No. 516,358, filed June 20, 1955, now Patent No. 2,785,669 and entitled "Injection Carburetion," of which this application is a continuation-in-part.

The charge forming device shown in this prior application comprises a plurality of sensing means for engine fuel requirements, preferably responsive to the rate of air flow to the engine through the air induction system, and engine pressures and temperatures for indicating the fuel requirements of the engine. These sensing means, in turn, control fuel metering means in passages supplied with fuel under pump pressure which deliver the metered fuel to the engine.

*This application is also a continuation-in-part of my prior application S.N. 622,917 filed November 19, 1956, now patent No. 2,876,758.*

According to this invention, the basic system above referred to has been modified in a manner to obtain a more stable datum pressure for more precise control of fuel metering.

According to this invention, the operating device for stabilizing the datum pressure controls a by-pass device for bleeding the datum line rapidly of fuel displaced by movement of the diaphragms opening the several nozzle valves to increase the flow of fuel to the combustion chambers of the engine.

According to this invention, the air flow measuring device in the engine induction system, which in turn controls the fuel metering, has been modified to obtain a variable response depending upon the degree and rate of the throttle valve opening. In this manner, the fuel flow to the engine can be increased and decreased depending upon engine load.

According to this invention, the pressure control device in the datum circuit, together with a means for modifying the rate of response of the air flow measuring device, comprise cooperating devices to improve the throttle response of the fuel system.

According to this invention, a means has been provided to increase the fuel flow for acceleration, which acts directly to effect operation of the fuel metering means by modifying the response of the air valve to the rate of air flow, causing the air valve to over-travel and the fuel delivery to increase when the throttle is opened.

According to this invention, the different fuel requirements of the engine at part throttle and full throttle loads are satisfied by a novel means, changing the fuel flow metering means by acting directly to affect air valve response to variation in the rate of air flow.

The accompanying drawings are illustrative of system modifications which will carry out the objects of this invention.

In the drawings.

In the detailed description of the invention which follows, the same reference characters will be used where possible to indicate the elements in this system corresponding with those in my prior identified applications.

ENGINE CHARGING FUEL SYSTEM

Figure 1:
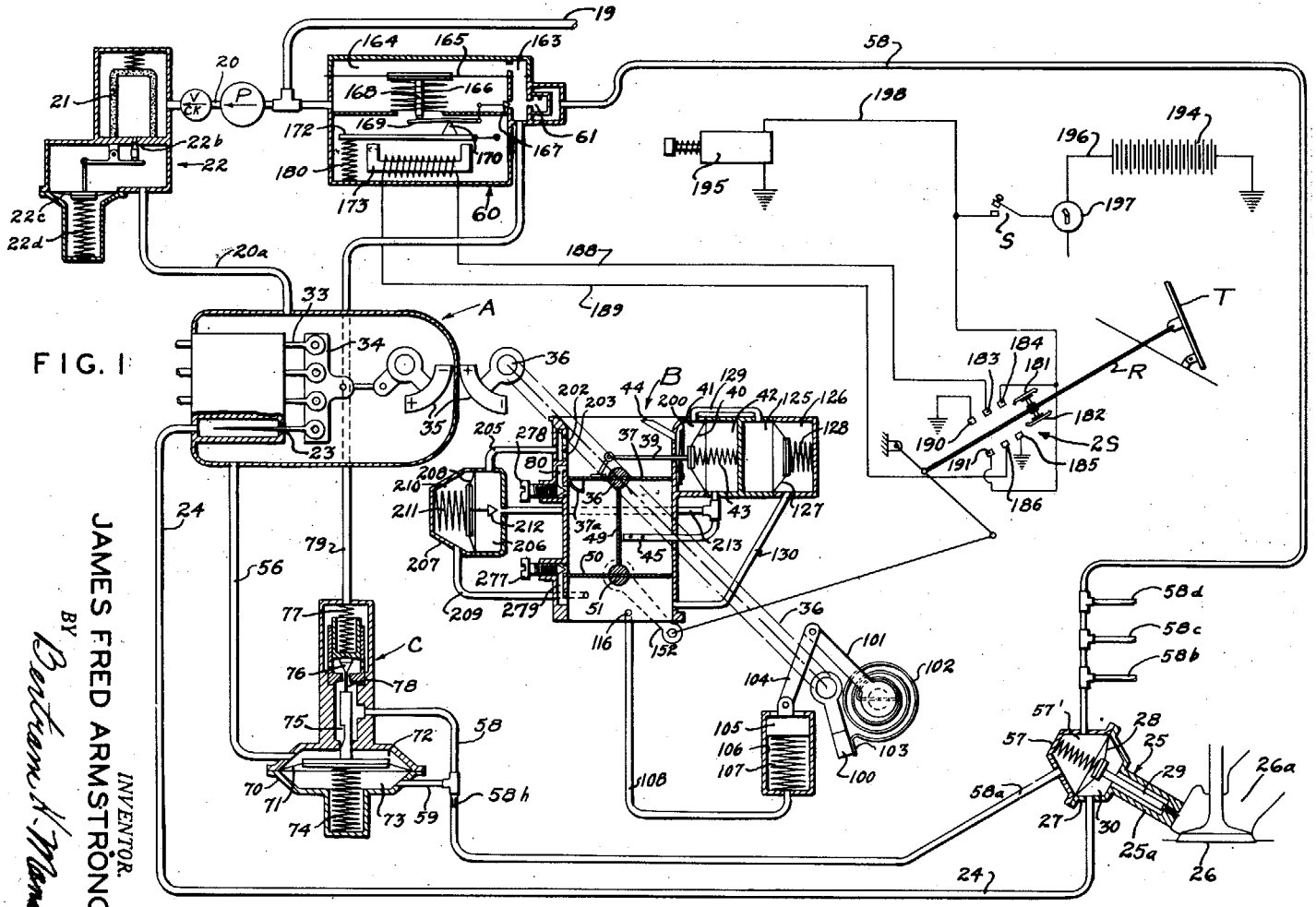
FIG. 1 is a schematic representation showing the interconnection of the elements of the system.

In FIG. 1 the fuel supply line 19 from the fuel tank connects with the inlet of the pump P. The outlet of the pump P connects by way of line 20 through a check valve with the pressure regulator 22. Within the pressure regulator is a diaphragm 22c acted upon by the pressure of the fuel passing the valve 22b controlled by the diaphragm. The spring 22d acts upon the rear face of the diaphragm 22c in a direction to open the valve 22b. The casing enclosing the spring 22d is generally vented to atmospheric pressure. A filter 21 is enclosed within the pressure regulator 22 to trap foreign matter passing through to the pressure regulator from the pump and the check valve.

Fuel chamber A is supplied from the pump P through the pressure regulator 22 by way of a line 20a. Within the fuel chamber A are a plurality of metering rods 33 operated within metering orifices 23 by a crosshead device 34. The position of the rods 33 is, in turn, controlled by a magnetic clutch 35 from a shaft 36 operated by an air valve in the air induction system of the engine hereinafter described.

Each metering orifice 23 is connected by a separate line 24 with a fuel nozzle 25. There are as many fuel nozzles as there are cylinders of the engine, but only one has been shown here.

Each nozzle 25 has a stem portion 25a which may be fixed within the cylinder head or induction manifold for the engine, so as to discharge fuel adjacent an intake valve 26 of an individual cylinder of the engine (not shown). Within the stem 25a is a valve element 29 controlling the outlet port of the nozzle, and this valve element 29 is, in turn, controlled by a diaphragm 28.

The lines 24, one of which is shown, connect with chambers 30 formed by the diaphragm 28 and the outer housing for the nozzle 27. A cap 57 secures the diaphragm in place and forms a second chamber 57' on the opposite side of the diaphragm 28 to which the datum pressure control line is connected.

THE DATUM PRESSURE SYSTEM

The datum pressure system connects with each of the chambers 57' of the nozzles 25, and the fuel pressure therein is established by the action of two pressure regulators controlling the inlet and the outlet therefrom, and, incidentally, the pressure drop across a discharge restriction from the datum pressure system to the inlet of the pump P. Fuel pressure is supplied to the datum system from the chamber A by way of a line 56 to pressure regulator C. This regulator comprises a casing 70 containing a diaphragm 71 dividing the casing into a pair of chambers 72 and 73. A spring 74 acts in a direction on the diaphragm 71 tending to close the valve 75 which is operated from the diaphragm. The valve 75 forms a variable restriction for charging the datum system. A small valve 76 is biased to a closed position by a spring 77 and has a stem 78 arranged for contact by the valve 75, so that when the valve 75 closes, the valve 76 is opened to allow fuel to escape through a by-pass line 79 to the pressure regulator 60. Datum pressure line 58 is supplied with fuel under pressure from line 56 when valve 75 is open, and has a connection 59 with chamber 73 of the pressure regulator C. Line 58 extends to the datum pressure chamber of each of the nozzles 25 by way of the series of branches 58a, 58b, 58c and 58d. At the outlet of the datum pressure line 58 is a metering restriction 61 in the form of a centrifugal jet or orifice.

Downstream of the orifice 61 is the pressure regulator 60 which has a chamber 164 therein formed by a diaphragm 165. A passage 163 connects chamber 164 with the metering restriction 61. Diaphragm 165 has a plunger 168 operating against a lever 169 which, in turn, controls the degree of opening of valve 167. Spring 166 resists the pressure of fuel in the chamber 164 on the diaphragm 165.

The lower portion of the casing of pressure regulator 60 has a pivoted lever 172 forced upwardly by the compression spring 180, which applies a force by way of the pivot 170 to the lever 169.

ENGINE PRIMING AND UNLOADING CONTROL

Lever 172 is a permanent magnet with opposite poles at opposite ends thereof. Below the lever 172 is an electromagnet 173 from which extend two leads 188 and 189 which connect with terminals 183 and 186, respectively, of a switch 2S.

Throttle pedal T has a throttle operating rod R carrying sliders 181 and 182 of the switch 2S. This switch also has upper contacts 184 and 190, the latter of which is connected to ground. Contact 184 is connected to a lower contact 191, while the other lower contact 185 is connected to the ground.

A battery 194 is connected to the ground at one terminal, and has the other terminal connected by way of lead 196 to an ignition switch 197 for the ignition system of the engine. Connected in series with the ignition switch 197 is a starter switch S controlling the flow of current through a lead 198 to starter motor 195 and also the circuit to energize terminals 184 and 191 of the switch 2S.

With the ignition switch 197 and starter switch S closed, the operation of the throttle pedal T to partially open the throttle will energize the electromagnet 173 by closing the circuit between contacts 183 and 184 with slider 181, and contacts 185 and 186 with slider 182. The final range of movement of the throttle pedal causes the sliders 181 and 182 to close the circuit from contact 183 to contact 190, and from contact 186 to contact 191, thereby reversing the flow of current through the electromagnet 173.

AIR INDUCTION SYSTEM FOR THE ENGINE

The engine (not shown) is provided with an air induction system having an air horn B communicating with a plurality of branches 26a which lead to the separate combustion chambers of the engine. These separate branches 26a are, in turn, controlled by separate intake valves 26. Since the parts of the air induction system (not shown) are conventional, no description or illustration is here included.

AIR MEASURING DEVICE

Within the air horn B is an air valve 37 fixed on a rotatable shaft 36. The shaft is extended by dotted lines on either side of the air horn, and one end thereof carries one half of magnetic clutch 35. The movements of the air valve 37 rotate the shaft 36 which, in turn, positions the fuel metering needles 33 through the interconnection of the magnetic clutch 35. The opposite end of the shaft 36 connects with a temperature responsive means 102 which has a free end 103 positioned to move into abutting relation with one end of a lever 100 fixed to the opposite end of the shaft 36. The inner end of the thermostat 102 is carried in the slot in the hub of lever 101 which is pivoted on the fixed structure of the air horn B. Piston 105 is connected with the free end of lever 101 by a link 104. The piston 105 rides in a cylinder 106 and is operated therein by a spring 107 acting in one direction and by engine suction acting in the opposite direction. Line 108 connects between the bottom of the cylinder 106 and a suction port 116 in the air horn B downstream of the throttle 50.

AIR FLOW SENSING MEANS

Connected with the air valve 37 is a link 39 which extends through the wall of air horn B and is attached to a diaphragm 40 which separates chambers 41 and 42 within a casing attached to the air horn B. A spring 43 acting against the back of the diaphragm 40 urges the valve 37 in a closing direction. An opening force on the valve is supplied from a servo-motor, which in turn is powered by the difference in pressures across the valve 37 as sensed by a vent tube 44 and a Pitot tube 45 connected with the chambers 41 and 42, respectively, of the servo-motor. The underside of the leading edge of the air valve 37 has a deflector or spoiler **37*a* fixed thereto. Below the air valve 37 is a throttle valve 50 mounted on a throttle shaft 51 and operated by lever 152 through a throttle linkage R from the accelerator pedal T. A slotted partition 49 extends between the throttle shaft 51 and the air valve shaft 36**.

The body of the air horn B has a by-pass passage 80 controlled by a metering screw 278, which extends around the edge of the air valve 37 when in the closed position. By adjustment of this screw 278, it is possible to vary the position of the air valve 37 in the low range of engine speeds at idle and slightly above. Since the air valve, in turn, controls the size of the fuel metering orifices 23, it is obvious that this adjustment 278 provides a fuel mixture control in the low range of engine speeds by setting the position of the air valve and needles 33 in the metering restrictions 23.

The air horn body B also has a by-pass 279 extending around the edge of the throttle 50 controlled by a metering screw 277. This by-pass is operative when the throttle is closed to adjust the amount of air flowing to the engine, and, in this sense, controls the engine idling speed.

FUEL MIXTURE CONTROL REGULATION FOR ACCELERATION

In order to obtain solid throttle response in most engines, it is necessary to increase the fuel-air ratio fed to the engine simultaneously with throttle opening; in other words, the pressure carburetor or injection system should perform a function of changing the fuel-air ratio simultaneously with throttle opening to accomplish the result performed in the carburetor by the accelerating pump.

One way of accomplishing this particular result contemplates the use of a means responsive to throttle opening for effecting a sudden movement of the air valve in an opening direction, which, in turn, withdraws the metering rods 33 from the orifices 23, increasing the fuel flow to the nozzles 25. This means, actually, causes air valve 37 to over-travel in response to throttle opening by applying forces thereto which act independently of, or augment, those forces regulating air valve position in response to the rate of air flow past the valve or the pressure drop across the valve.

One structure for accomplishing this result is shown in FIG. 1, wherein the air horn B is provided with an extension on the servo-motor casing divided into two chambers 125 and 126 by a diaphragm 127. A spring 128 urges the diaphragm 127 in a direction to compress the air in chamber 125. Chamber 126 is connected by a line 130 to the air horn B posterior of the throttle 50, and is thereby subjected to manifold pressure. Chamber 125 is connected by a by-pass passage 129 to the chamber 41 of the servo-motor. The inlet opening to the chamber 41 from the vent tube 44 is controlled by a leaf spring type of valve 200 ordinarily biased to the open position.

OPERATION OF MIXTURE CONTROL RESPONSIVE TO THROTTLE MOVEMENT

During operation of the engine with the throttle 50 within the range from closed to part throttle positions, sufficient suction is present posterior thereof acting in the chamber 126 to hold the diaphragm 127 in the position illustrated, with the spring 128 compressed. If the throttle is suddenly opened from any position within this range, suction in chamber 126 becomes insufficient to maintain spring 128 compressed so that spring 128 expands, forcing the air within the chamber 125 into the chamber 41. The increase in pressure in chamber 41 closes leaf spring valve 200 and, at the same time, causes the diaphragm 40 to be flexed against the compression spring 43, thereby forcing the air valve 37 to rotate in the opening direction beyond the normal position which it would take in response to the increasing rate of air flow through the intake stack B. This over-travel is a temporary matter, since there is always some leakage past the valve 200, and the excessive pressure within the chamber 41 will eventually dissipate. It will be appreciated, however, that during the time in which the temporary high pressure prevails in the chamber 41, valve 37 will over-travel in the opening direction, causing the needles 33 to withdraw from the metering orifices 23 to temporarily increase the fuel flow to the nozzles 25.

PART THROTTLE AND FULL THROTTLE MIXTURE CONTROL

Most engines of the automotive type will operate satisfactorily on a leaner mixture in the part throttle range corresponding to road load operation than in the substantially full throttle range corresponding to the full load operation. For this reason, it is possible to go to the carburetor art for an analogy. For example, it is customary practice in carburetors to use stepping metering rods in the fuel metering orifices which are operated in response to changes in manifold pressure. The size of the fuel metering orifice is increased by proper rod movement, to enrich the fuel mixture throughout the range of engine speeds within the full open range of throttle positions.

The mechanism just described is usually referred to as a step-up in a carburetor. The corresponding function is performed in my prior application by a control in the datum pressure line. In the instant invention, the same function is performed by a means responsive to a condition indicating increases in load on the engine, which will act to increase the fuel flow to the engine. This means in the present invention accomplishes this function by changing the response indications of the air valve 37 to the rate of air flow through the air horn B. This mechanism is mounted on the air horn, or adjacent the air horn, and connected with the servo-motor in the following manner.

In the wall of the air horn anterior of the air valve 37 are a pair of ports 202 and 203 so placed that they are within a zone influenced by the passage of air between the wall of the air horn B and the edge of the air valve 37 when the latter is in a partially open position. These ports connect with a common passage communicating by way of a tube 205 with a chamber 206 in the casing 207. A diaphragm 208 separates chamber 206 from chamber 210. The diaphragm 208 is biased in one direction by a spring 211, and carries a valve 212 which operates to and from a valve seat in a metered restriction at the entrance of tube 213, which, in turn, connects with the chamber 42 of the servo-motor by way of the line extending from the Pitot tube 45. Chamber 210 is connected with the air horn B posterior of the throttle 50 by a tube 209. Suction posterior of the throttle is thereby communicated to the chamber 210 to compress the spring 211 and separate the valve 212 from its seat.

If there is insufficient suction in chamber 210, the spring 211 will close the valve 212.

OPERATION OF PART THROTTLE AND FULL THROTTLE MIXTURE RATIO CONTROL

In the part throttle range of engine operation, it can be assumed that engine intake manifold depression is always greater than six inches of mercury. Accordingly, spring 211 is calibrated in such a manner as to retain the valve 212 unseated, so that restricted amount of air bleeds from the ports 202 and 203 (when one or both are anterior of the air valve 30) through the chamber 206 and line 213 to modulate the suction in chamber 42 sensed by the Pitot tube 45. The power exerted by the servo-motor on the air valve 37 and against the spring 43 is thereby reduced an amount which will cause a substantial pressure drop in the air horn B across the valve 37. In other words, the opening movement of the air valve 37 is somewhat restricted by the operation of the bleed from the ports 202 and 203, and the position which the air valve 37 assumes, results in a displacement of the needles 33 in the orifices 23 only sufficient to give a mixture proper for part throttle, road load operation of the engine.

After the air valve 37 reaches a substantial open position within the range of 55° or 60°, however, ports 202 and 203 are posterior of the valve and within the high velocity air stream which will be passing between the side wall of the air tube B and the deflector 37a on the air valve 37. This drop in pressure, due in part to the high velocity stream, can either cut off or substantially reduce the flow of air through the ports 202 and 203, and consequently the amount of air bled past the valve 212 and through line 213 to chamber 42. When the air bleed through ports 202 and 203 is stopped, the servo-motor exerts a greater force on the air valve 37 directly proportional to the drop in pressure measured by the Pitot tubes 44 and 45, thereby opening the air valve 37 to decrease the drop in pressure across the valve 37. The response of the air valve causes the needles 33 to move out of orifices 23 sufficiently to provide the power range of fuel mixtures necessary. Generally, this occurs in the higher ranges of engine speed and throttle openings.

At any engine speed, throttle opening which decreases manifold suction to less than the arbitrarily selected example of six inches of mercury causes spring 211 to expand, closing valve 212 and cutting off the bleed from the ports 202 and 203 so that the air valve assumes a position under control of the drop in pressure measured between the Pitot tubes 44 and 45 exclusively. The pressure drop across the valve 37 thereby becomes minimum, and the angular displacement of the valve is increased to withdraw the needles 33 and give increased fuel delivery (corresponding to a full power mixture). Conversely, the reverse operation occurs if the throttle is closed at any engine speed.

From the above described operation, it will be readily understood that the air valve 37 may take up two distinctly different positions for the same rate of air flow. The smaller amount of displacement will occur in the part throttle range of operation of the engine so long as manifold suction indicates low engine loads. Larger displacements of the valve 37 will occur as soon as the valve opening exceeds 55° or 60°, or if the throttle is opened wide enough to decrease the manifold suction below some arbitrary point such as, for example, the intake manifold depression of six inches mercury pressure mentioned.

It is contemplated that the contour of the needles 33 is such that the displacements produced by the air valve 37 when the engine is operated throughout its speed range at full throttle will give the proper fuel flow through the orifices 23 to match the fuel-air ratios demanded by the engine at full load. This means that the part throttle mixture ratios delivered by lesser displacements of the air valve 37 for the same rate or air flow produce lesser displacements of the needles 33 in the orifices 23. The deree of change in needle displacement can be suitably controlled by calibration of the ports 202 and 203, by variations in port location and size. Obviously, these ports can e placed in such a relation to the air valve 37 as to be ithin the influence of the air stream passing between ie wall of the air horn and deflector 37a at any point in ie opening movement of the air valve. Thus the ports an be progressively subject to a zone of low pressure adicent the deflector 37a, which zone will progressively ass over the ports as the air valve 37 opens. According-, the pressure at the ports 202 and 203 is a variable epending upon air valve displacement.

The shape of the part throttle fuel mixture curve can e determined arbitrarily by a change in location and ze of the ports, and this calibration is flexible over a ibstantial portion of the range of opening movement of ie air valve 37.

OPERATION OF FUEL INJECTOR

To start the engine, it is first necessary to close the nition switch 197 and then crank the engine by closing ie starter switch S, which, incidentally, energizes the ontacts of switch 2S. When the engine is below normal perating temperature, thermostat 102 will wind up exert-g a force on the lever 100, so that when the throttle is irtly open, as is proper during a cold start, the air valve 7 can open in response to thermostat action and increase e amount of fuel delivered to the engine. After the igine starts, manifold suction acting on the piston 105 ill decrease the opening movement produced on the air ilve 37 by the thermostat 102 so as to reduce the fuel ixture ratio to that proper for warm-up. The force erted by the thermostat 102 decreases as the engine mperature increases until, at normal engine temperares, the end 103 moves out of contact with the lever 10, leaving the air valve free to be controlled by the rvo-motor. The action of the thermostat 102 on the air ilve 37 affects the displacement of the air valve 37 with spect to air flowing through the air horn B and in a rection to withdraw the needles 33 from the orifices 23 id increase the fuel mixture ratio during cranking and irm-up.

The throttle pedal T also can be opened far enough, if eded, to prime the engine with excess fuel regardless of e action of the engine temperature controlled enrichent produced by the above-described mechanism. The iming operation is accomplished during cranking by ening the throttle part way to close the switch 2S. In is throttle position or range, contacts 183 and 184 are osed by the slider 181, and the contacts 185 and 186 are osed by the slider 182. This energizes the electromagnet 3 in the pressure regulator 60, applying a force to the rmanent magnet 172 to compress the spring 180 and wer the pressure tending to close the valve 167.

When the force of spring 180 is reduced by the action the electromagnet, the regulated pressure maintained the pressure regulator 60 is reduced, and the pressure ferential across the metering restriction 61 increases by corresponding amount.

During normal operating conditions of the system, the essure in the datum system is controlled by the regula- C, and the presence of the metering orifice 58H has effect upon the function of the regulator C because of very small amount of flow permitted by the coaction the orifice 61 and the regulator 60. The orifice 61 is smaller of the two flow restrictions 58H and 61.

As will be apparent, the basic datum system has two w metering restrictions, 58H and 61, in series, operating a controlled pressure drop between regulator C and gulator 60. With two or more fixed restrictions in ies, a certain amount of metering will be done by all so ig as there is a measurable pressure drop across each triction. Also, there is less metering done at the larger triction. Consequently, metering requires a pressure op.

In this system, restriction 58H is larger than restriction 61, and at normal flow there is no measurable pressure drop across the restriction 58H. If the flow through the datum system is increased, the pressure drop across 58H becomes significant. In other words, the more the flow, the greater the pressure drop and the greater the metering effect of restriction 58H.

When rates of flow through the orifice 61 increase above normal, there will be a substantial increase in the pressure drop across the orifice 58H, lowering the pressure in the datum system to increase the flow through the nozzles 25 by increasing the pressure drop across the metering orifices 23 which provide the metering in the engine charging system. During the priming operation, however, the function of the pressure regulator C to establish a fixed datum pressure is modified by the action of the orifice 58H. The metering effect of this orifice prevents the regulator C from maintaining the pressure when the flow in the system is increased by lowering the pressure downstream or orifice 61 to reduce the back pressure maintained by regulator 60 as above described.

When the engine starts, the starter switch is opened, thereby de-energizing the circuit to the electromagnet 173 in the pressure regulator 60. This builds up the pressure downstream of the metering restriction 61, decreasing the rate of flow to the normal, which is about 3½ pounds an hour. At this low rate of flow, there is no measurable pressure drop across the metering restriction 58H, and the pressure in the datum system will increase to the setting of the pressure regulator C. Flow through each of the nozzles 25 will decrease as the datum pressure increases, raising the pressure downstream of the metering orifices 23. Thus, under normal operation of the system, the pressure drop across the metering orifices 23 becomes the same as the pressure setting of the regulator C, and is maintained constant by this regulator.

If, during the starting of the engine, the combustion chambers are flooded so that unloading is necessary, then the throttle T is fully opened so that the switch 2S closes the circuit between contacts 183 and 190 and 186 and 191 to reverse the flow of current through the electromagnet 173, changing its polarity. This effects a new relation between the electromagnet 173 and the permanent magnet 172, placing like poles opposite, and produces an added force augmenting the force of the spring 180, both forces acting in the direction to close the valve 167. The pressure downstream of the metering restriction 61 will be increased, and this effect will be felt throughout the datum system, since when flow stops in the datum line 58, the pressure will increase, tending to close the valve 75 in the regulator C and open the valve 76. However, the closing of valve 167 will prevent discharge through the line 79, tending to lower the datum pressure, so that the datum system becomes more or less a sealed system at a higher pressure than normal to effectively close the nozzle valves 25 and shut off the flow of fuel to the engine.

During cranking and running of the engine, pump P will be operating, delivering fuel through the pressure regulator 22 into the fuel chamber A. The metering of the fuel is accomplished by varying the area of the metering orifices 23 in the fuel chamber A, and these variations in area are accomplished simultaneously and equally by a plurality of metering rods 33 controlled from the position of the air valve 37 through the magnetic clutch 35. As above explained, the air valve 37 will assume positions indicating the rate of air flow to the engine for both the part throttle and full throttle range of engine operation, depending upon engine load.

In this system, the pressure drop across each of the orifices 23 is maintained equal by regulating nozzle valves 25 which are primarily controlled by the pressure regulator C, which is supplied with fuel at chamber pressure A through the line 56. The action of the pressure regulator C is such that a constant pressure difference is maintained between the pressure in line 56 and in the datum system line 58, regardless of engine operating conditions or pump pressure fluctuations. Only during cranking is the datum pressure variable. The construction of the pressure regulator C is such that the charging pressure in line 56 tends to open the valve 75 of the regulator, while back pressure from the datum system through the line 58a and connection 59 tends to close the valve 75. The difference between the charging pressure and the datum pressure is actually controlled by the spring 74 biased against the effective area of diaphragm 71.

As described above, the effect of sudden throttle opening on the system increases the flow of fuel through each of the lines 24 by withdrawing the needles 33 and increasing the size of the metering orifices. This action is due in part to the over-travel produced on the air valve 37 by the pumping action of the diaphragm 127 and in part to increase air flow. The increase in the rate of fuel flow through the lines 24 causes an increase in fuel pressure in chambers 30, which moves the diaphragms 28 in each of the nozzles in a direction to displace fuel from chambers 57 on the opposite sides of the diaphragms into the datum pressure system, and primarily into line 58. Unless provision is made in the system to accommodate the fuel displaced by each of the diaphragms 28, there will be an instantaneous pressure rise in the datum system which will resist instant opening of nozzle valve 29, and throttle response of the engine will be adversely affected by the lag in the nozzle valve action.

It is a feature of this invention to compensate for this condition by the valve 76 connecting with the pressure relief by-pass line 79, for conducting any excess fuel from the datum system to a point downstream of the centrifugal metering jet 61.

Thus, any instantaneous pressure increase in the datum line 58 is compensated for by the fact that diaphragm 71 will respond, opening relief valve 76 to discharge fluid from line 58 and thus prevent the build-up of back pressure caused by the displacement of the diaphragms 28.

From this description of the operation it will be readily understood that there is a definite cooperation between the action of the pressure regulator C and the mechanism in the air horn structure controlling the displacement of the air valve 37, although these devices are controls located in separate systems incorporated in the device.

FIRST MODIFIED FORM

In the form of the invention heretofore described, the pressure regulator C in the datum pressure system is located upstream from each of the nozzles 25, but this location is not critical to the proper functioning of the system. Actually, the pressure regulator C may just as well be located downstream of the nozzles 25 in the datum pressure system, and yet, in this location, perform in the same manner to produce a similar result.

Figure 2:
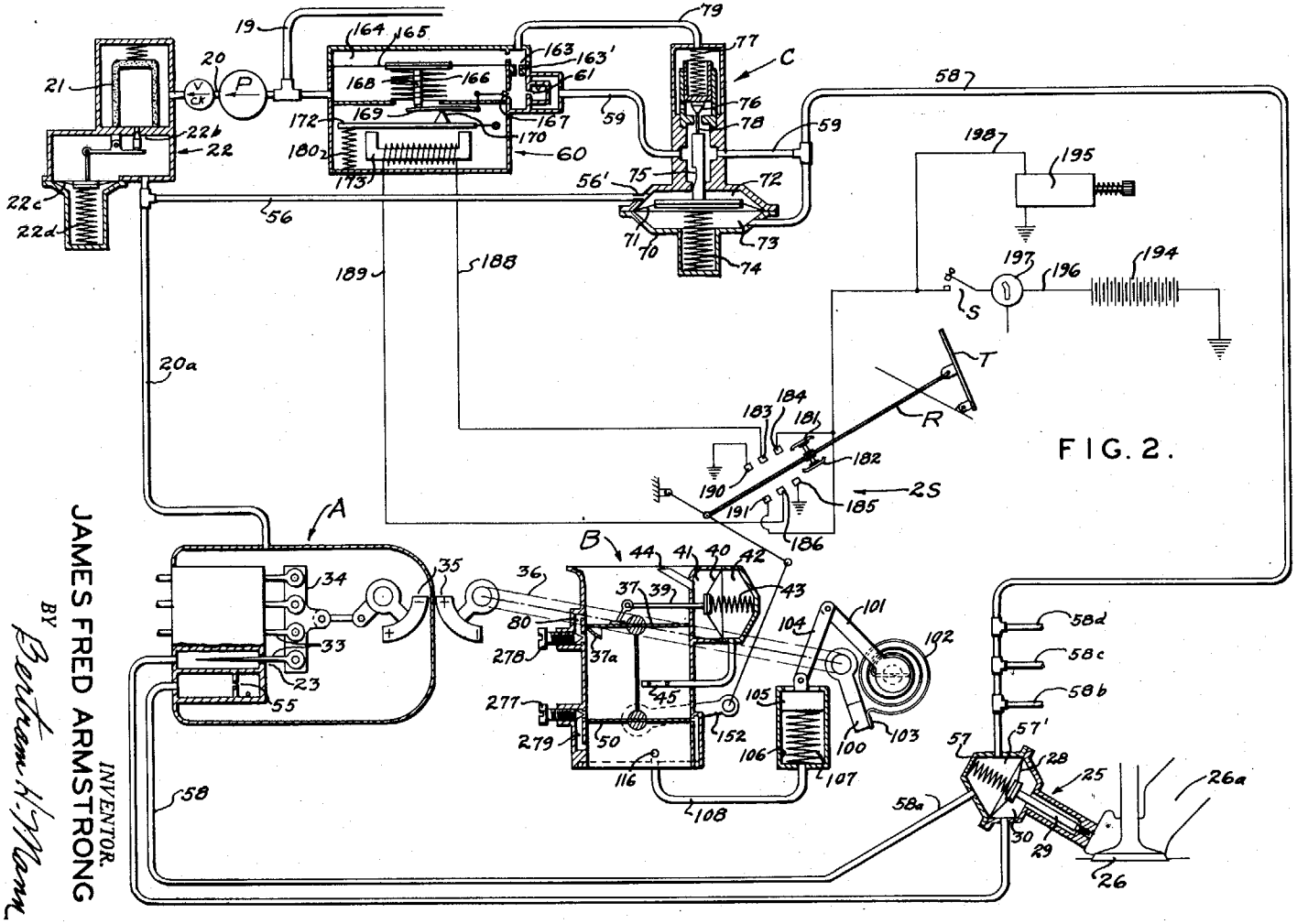
FIG. 2 is a schematic representation of a modification of the above described system.

FIG. 2 illustrates a variation of the combination of elements shown in FIG. 1 in which the pressure regulator C is actually located downstream of the injection nozzles in the datum pressure system.

In FIG. 2 the same reference characters have been used to indicate like parts corresponding with those shown and described in FIG. 1. The detailed description which follows will emphasize the differences between the systems of FIG. 1 and FIG. 2, which differences are confined to the datum pressure system. It is believed that the preceding description will serve to explain the construction and operation of other parts of the system illustrated in FIG. 2.

According to FIG. 2, the datum pressure system is connected to the pressure chamber A by a line 58, and communicates therewith by way of a suitable metering restriction 55. As will be pointed out hereinafter, restriction 55 permits a continuous circulation from the chamber A through the datum pressure line to eliminate the accumulation of air or vapors therein, or to remove any air or vapors trapped therein in case the fuel supply fails. If the fuel tank of the vehicle goes dry, some provision must be made to bleed the system of air.

The datum pressure line 58 has branches 58a, 58b, 58c and 58d, each of which connects with the datum pressure chambers of the nozzles 25. Adjacent the outlet of the line 58 is the pressure regulator C, which is of the same construction as that heretofore described. The pressure in the line 58 is imposed against a diaphragm 71 of the pressure regulator C. The opposite side of the diaphragm communicates with the pressure downstream of the regulator 22 by way of the line 56, which has the same pressure as 20a and chamber A. Branch 59 connects the line 58 with the chamber of the pressure regulator C downstream of valve 75 and extends from this chamber to the metering orifice 61. A line 79 connects the outlet of the pressure regulator relief valve 76 with a restricted passage 163 leading to the outlet valve 167 of the pressure regulator 60. The construction of the pressure regulator C is identical with that above described.

OPERATION OF MODIFIED FORM

In this modification, it is preferred to make the metering orifice 55 smaller than the metering orifice 61, and of less capacity. When this relationship exists, the datum pressure is actually under control of the regulator C, which opens the valve 75 slightly, under normal conditions, to raise the datum pressure in the line 58 to the desired differential between the chamber and line 58. The diaphragm 71 is balanced by the force of charging pressure from the line 56 on one side, and datum pressure plus the force of the spring 74 on the opposite side, so that the difference between charging pressure and datum pressure is determined by the force of the spring 74. Under steady conditions, the diaphragm 71 will take up a position opening the valve 75 slightly so that fuel will be flowing into the datum system through both the orifice 55 and the valve 75.

If the datum pressure in line 58 should increase for any reason, such as the rapid withdrawal of the needles 33, which would cause the opening of the valves 25 and displacement of the diaphragms 28 therein, the pressure regulator C will react, closing the valve 75 and opening the valve 76 to bleed the pressure rapidly from the datum pressure line 58 through the line 79 into the chamber 164 of the pressure regulator 60. As before explained, the effect produced on the pressure regulator 60 opens the valve 167 thereof, dropping the pressure downstream of the metering restriction 61. This effect produces a lowering of the datum pressure throughout the entire datum pressure system by increasing the discharge through the metering restriction 61 so that fuel can escape. At this point it should be noted that the restriction 163' in the passage 163 will cause a delay in the pressure drop in chamber 164, and this delay may be regulated by proper calibration of this restriction. By variations in restriction size, the downstream pressure drop can have more or less an instantaneous effect upon the system, or a prolonged effect.

As has been explained heretofore, when the pressure drop across orifice 61 increases, the flow therethrough increases, which makes the restriction 56' more effective as a pressure control. A greater drop across 61 causes a greater drop across orifice 58' and lowers the datum pressure, increasing the flow from each of the nozzles 25. This increase in flow increases the mixture ratio temporarily for acceleration of the engine. If the particular engine requires a prolonged enrichment for satisfactory performance, then the restriction 163' placed in the passage 163 may be suitably selected to attain this purpose.

For other engines having different characteristics, it may be desirable to have the enrichment of the mixture take place over an extremely short period of time. In such a case, it may not be desirable to prolong the pressure drop in the datum system by increasing the discharge therefrom through the metering restriction 61, as heretofore described. For such an engine, a different system is proposed which includes a different interconnection between the same parts of the system as above described. Such a system is shown in FIG. 3.

SECOND MODIFIED FORM

Figure 3:
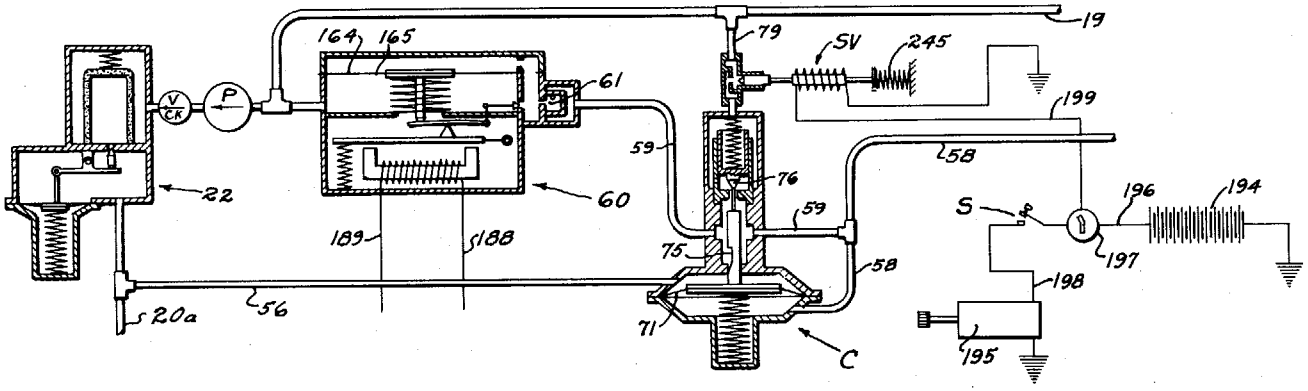
FIG. 3 is a schematic representation showing the interconnection of similar elements forming a second modification.

In the system illustrated in FIG. 3, the same reference characters have been used, where possible, to indicate like parts, and the description thereof will be limited to the differences in the interconnections between the parts.

According to FIG. 3, the pressure regulator C is connected by a line 79 directly with the inlet of the pump P, line 19. In the line 79 is a solenoid valve SV powered by a circuit 199 energized on closing of the ignition switch 197. The valve is retained open when the engine ignition switch is on, and a spring 245 closes the valve when the ignition is turned off.

OPERATION OF FIG. 3

In this system, the operation of the pressure regulator C produces no delaying effect upon the pressure regulator C produces no delaying effect upon the pressure regulator 60. Consequently, the action of the two regulators C and 60 is distinct. The regulator C will retain the pressure in the line 58 in the same manner as above described, and further respond to any increase in pressure in the datum pressure line 58 to relieve this pressure through the valve 76 so long as the engine is operating. The opening of the valve 76, however, will produce very little fluctuation in the datum pressure line 58. In this system, its function is primarily to prevent the pressure therein from exceeding the fixed or regulated pressure established by the diaphragm 71. What slight lowering of the pressure does occur below the regulated pressure will be very short in duration. In this respect its action differs from the prior described devices.

When the engine is shut off by turning off the ignition switch 197, solenoid valve SV will close so as to prevent any bleed-down in the datum pressure line 58.

MODIFIED FORM OF FUEL MIXTURE CONTROL REGULATION FOR ACCELERATION

Figure 4:
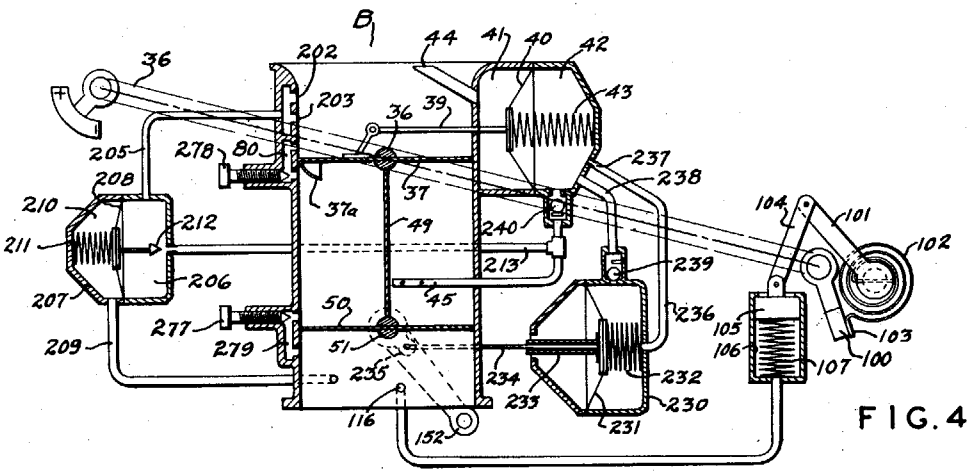
FIG. 4 is a modified form of air horn.

In the description of FIG. 1 a means was described to obtain solid throttle response of the engine. This means was likened in result to the effect of an accelerating pump in a carburetor. In FIG. 4 is shown a modified form of such a device which is mechanically actuated from the throttle, instead of pneumatically actuated from manifold pressure.

In FIG. 4 the same reference characters have been used to indicate like parts, and this description will be limited to the modified form of the device operating to attain this result. The throtle operating shaft 51 carries a fixed lever 235 connected with a rod 234 which extends within a tube 233, which guides the rod 234 during movement of the throttle from open to closed positions. The tube 233 is attached to a diaphragm 231 in a suction pump casing 230. The rod 234 is not solidly attached to the diaphragm, and actually forms a one-way operating connection for forcing the diaphragm 231 against the pressure of a spring 232 when the throttle is moved in the closing direction. Opening movement of the throttle withdraws the rod 234 within the tube 233, permitting the spring 232 to expand, moving the diaphragm 231 to the left.

The movement of the diaphragm 231 to the left produces a depression within the diaphragm chamber of the pump 230, which is communicated by way of the line 236 controlled by restriction 237 to the suction chamber 42 of the servo-motor for operating the air valve 37. A second line 238 connects the pump chamber to the servo-motor chamber 42, and is controlled by a check valve 239, which closes in response to the action of the pump 230 when the throttle is opened, and opens when the throttle is returned.

The connection between the Pitot tube 45 and lead line 213 with the servo-motor chamber 42 is controlled by a one-way check valve 240 which opens when the pressure in the lines 213 and 45 is less than in the diaphragm chamber 42 of the servo-motor. The check valve 240 is here illustrated as a ball valve and is designed to have a slight leakage when closed, due to the fact that the depression in the chamber 42 is less than in the connecting lines 213 and Pitot tube 45, but it is contemplated that a flat check valve may be used at this point actuated in the same manner by the same differential pressures and provided with a metered hole, if desired. The size of that hole will control the duration of over-travel of the air valve 37, as will be explained hereinafter.

OPERATION

In this modification, opening movement of the throttle 50 by operation of the throttle control arm 152 connected with the throttle pedal T permits expansion of the spring 232 and movement of the diaphragm 231 to the left, as viewed in FIG. 4. Since the check valve 239 is closed, diaphragm movement creates a depression within the suction pump 230 which is communicated by way of the line 236 to the chamber 42 of the servo-motor controlling the air valve 37. The strength of the spring 232 is sufficient to produce an action of the diaphragm 231 which is rapid, and which will close the check valve 240 so that the pumping action will be communicated directly to the chamber 42 to affect air valve position by increasing the differential pressure across the diaphragm 40 of the servo-motor. As the valve 37 opens in response to the action of the pump 230, metering needles 33 will be withdrawn to increase the flow of fuel to the nozzles 25 and thereby increase the mixture ratio by supplying a greater amount of fuel to the engine. The duration of this effect, as well as the rate of response of the air valve 37, can be easily controlled by adjusting the leakage past the check valve 240 and the size of the restriction 237. As above mentioned, if a disk valve is used, it can be formed with a hole for metering the leakage past the valve 240.

When the throttle 50 is closed by removing pressure from the throttle pedal T, a return spring in the linkage moves the throttle toward closed position until the rod 234 begins to force the diaphragm 231 to the right, forcing the air trapped in the diaphragm chamber of the pump 230 out of the chamber through the lines 236 and 238. Since both lines 238 and 237 can open, the rate of closing movement of the throttle is not substantially retarded, and the effect on the servo-motor is rapid. In all other respects, the modification in FIG. 4 is constructed and operates in the manner already described above with reference to FIG. 1.

The foregoing describes a structure which will perform all of the functions and attain all of the results set forth above, but it is contemplated that other modifications will occur to those skilled in the art which come within the terms of the appended claims.

I claim:

1. An engine charge forming device having a system for maintaining the flow of fuel to the engine in one stream proportional to the flow of air to the engine in a separate stream, said device comprising a valve in said air stream, a servo-motor for moving said valve in an opening direction, and a source of power for operating said servo-motor in response to changes in the rate of flow in the air stream past said valve so that changes in air valve position produced by said servo-motor indicate a measure of the rate of air flow to the engine, a throttle valve in the air stream for limiting the flow of air to the engine, and means responsive to throttle movement connected to said servo-motor for temporarily changing the power output of said servo-motor and thereby the rate of response of said air valve to changes in the rate of air flow past said valve.

2. An engine charge forming device having a system for maintaining the flow of fuel to the engine in one stream proportional to the flow of air to the engine in a separate stream, said device comprising means for measuring the flow of air to the engine, said means including a member movable in the air stream in response to variation in the rate of air flow to the engine, means for measuring the flow of fuel to the engine, a connection between said measuring means to maintain the flow through each stream proportional to the other, a throttle valve in the air stream for limiting the rate of air flow, and means connecting said movable member with said throttle and operated by said throttle for temporarily and suddenly changing the proportions of fuel flow to air flow during throttle movement.

3. An engine charge forming device having a system for maintaining the flow of fuel to the engine in one stream proportional to the flow of air to the engine in a separate stream, said device comprising a valve in said air stream, a servo-motor for moving said valve in an opening direction, a source of power for operating said servo-motor in response to changes in the rate of flow in the air stream so that changes in air valve position indicate a measure of the rate of air flow, means for measuring the flow of fuel to the engine, a connection between said measuring means to maintain the flow through each stream proportional to the other, a throttle valve in the air stream for limiting the flow of air to the engine, and means connecting said fuel metering means and said throttle for temporarily and suddenly changing the proportions of fuel flow to air flow during throttle movement.

4. An engine charge forming device having a system for maintaining the flow of fuel to the engine in one stream proportional to the flow of air to the engine in a separate stream, said device comprising a valve in said air stream, a servo-motor for moving said valve in an opening direction, and a source of power for operating said servo-motor in response to changes in the rate of flow in the air stream so that changes in air valve position indicate a measure of the rate of air flow, means for measuring the flow of fuel to the engine, a connection between said measuring means to maintain the flow through each stream proportional to the other, a throttle valve in the air stream for limiting the flow of air to the engine, and means responsive to throttle movement for temporarily changing the proportions of fuel flow to air flow by modifying the source of power supplied to said servo-motor.

5. An engine charge forming device having a system for maintaining the flow of fuel to the engine in one stream proportional to the flow of air to the engine in a separate stream, said device comprising a valve in the air stream, a servo-motor for operating said valve in an opening direction, means for operating said servo-motor in response to changes in pressure differential in the air stream across said valve, whereby the position of the valve in the air stream becomes a measure of air flow to the engine, means for measuring the flow of fuel to the engine, a connection between said measuring means to maintain the flow through each stream proportional to the other, a throttle in the air stream for limiting the air flow to the engine, means connected to said servo-motor comprising an air bleed passage, and inlet ports for said passage located in the air stream adjacent the opening edge of one of said valves.

6. An engine charge forming device having a system for maintaining the flow of fuel to the engine in one stream proportional to the flow of air to the engine in a separate stream, said device comprising a valve in the air stream, a servo-motor for operating said valve in an opening direction, means for operating said servo-motor in response to changes in pressure differential in the air stream across said valve, whereby the position of the valve in the air stream becomes a measure of air flow to the engine, means for measuring the flow of fuel to the engine, a connection between said measuring means to maintain the flow through each stream proportional to the other, a throttle valve in the air stream for limiting the air flow to the engine, and means connected to said servo-motor and operated by changes in pressure downstream of the throttle including a suction operated valve to modify the action of said servo-motor, an air bleed passage controlled by said valve and connected to said servo-motor, and inlet ports for said passage located in the air stream adjacent the opening edge of said air valve.

7. An engine charge forming device having a system for maintaining the flow of fuel to the engine in one stream proportional to the flow of air to the engine in a separate stream, said device comprising a throttle controlling the flow of air to the engine, a variable capacity air metering means for measuring the air flow past said throttle, means for varying the capacity of said air metering means to maintain the rate of air flow therethrough within a given range in the higher range of engine speeds and throttle openings, means to modify the response of said air valve to the rate of air flow at different engine speeds and lower range of throttle openings, a second variable capacity metering means in said fuel stream operated directly by changes in capacity of said variable capacity air metering means whereby the capacity of both metering means is increased or decreased together, and throttle operated means for temporarily varying the response of said air metering means.

8. In an engine charge forming device having an air conduit with an air inlet and air outlets connected with the combustion chambers of the engine, a throttle valve in said inlet, a fuel chamber receiving fuel under pressure and delivering fuel under pressure to the combustion chambers of the engine through separate branches, and a system for maintaining the flow of fuel proportional to the flow of air, said system comprising: a disk valve in said inlet, a pivot about which said valve is hinged for swinging movement to form a variable air flow restriction in said inlet, a deflector surface on the leading edge of said valve relative to the direction of air flow to said engine, said deflector surface being positioned on said valve to coact with the air stream and the wall of said inlet so as to modify the slope of the curve representing opening torque for the valve, a motor connected to operate said valve to vary the opening area of said air flow restriction, a means sensitive to velocity of the air stream passing the valve for controlling the power output of said motor to determine the position of said valve in the air stream in response to changes in velocity sensed, means responsive to throttle opening for effecting a sudden movement of the air valve in an opening direction, and fuel metering means in said branches operated by change in position of said valve.

9. In an engine charge forming device having an air conduit with an air inlet and air outlets connected with the combustion chambers of the engine, a throttle in said inlet, a fuel chamber receiving fuel under pressure and delivering fuel under pressure to the combustion chambers of the engine through separate branches, and a system for maintaining the flow of fuel proportional to the flow of air, said system comprising: a disk valve in said inlet anterior of said throttle, a pivot about which said valve is hinged for swinging movement to form a variable air flow restriction in said inlet, a deflector surface on the leading edge of said valve relative to the direction of air flow to said engine, said deflector surface being positioned on said valve to coact with said air stream and the wall of said inlet so as to modify the slope of the curve representing opening torque for the valve, a motor connected to operate said valve to vary the open area of said air flow restriction, a means sensitive to the pressures in the air stream passing the valve and operative in response to throttle movement for controlling the source of power for operating the servo-motor to determine the position of said valve in the air stream in response to changes in pressures sensed, means connected with said motor and operated by changes in load on said engine for modifying the action of said motor, and fuel metering means in said branches operated by changes in position of said valve.

10. In an engine fuel charging system of the pressure type having a fuel inlet, a fuel outlet for discharging fuel to the engine, a pump supplying fuel under pressure to said inlet, a fuel line normally pressurized from said pump connecting said inlet and said outlet, a pressure regulator having a movable wall controlling a valve at said outlet, a datum pressure system including a by-pass extending around said pump, and opposed expansible chambers separated by said movable wall and connected with said datum system and said fuel line, respectively, whereby said regulator maintains the fuel in said fuel line at a pressure proportional to the controlled pressure in said datum system, the combination therewith of means for establishing a controlled pressure in said dataum system at a fixed differential with respect to said pump supply pressure, a datum pressure relief passage from said control means, and means responsive to a pressure increase in said established datum pressure from said fixed differential for opening said pressure relief passage.

11. In an engine fuel charging system of the pressure type having a fuel inlet, a fuel outlet for discharging fuel to the engine, a pump supplying fuel under pressure to said inlet, a fuel line normally pressurized from said pump connecting said inlet and said outlet, a pressure regulator having a movable wall controlling a valve at said outlet, a datum pressure system including a by-pass extending around said pump, and opposed expansible chambers separated by said movable wall and connected with said datum system and said fuel line, respectively, whereby said regulator maintains the fuel in said fuel line at a pressure proportional to the pressure in said datum system, the combination therewith of means for establishing a controlled pressure in said datum system proportional to the fuel supply pressure comprising a metering restriction in said by-pass downstream of said pressure regulator, means controlling the pressure drop across said metering restriction, a datum pressure relief passage by-passing said restriction, and means responsive to a pressure increase in said datum pressure system from said established proportional pressure for opening said pressure relief passage.

12. In a fuel charging system of the pressure type having a fuel inlet, a fuel outlet for discharging fuel to the engine, a pump supplying fuel under pressure to said inlet, a fuel line normally pressurized from said pump connecting said inlet and said outlet, a pressure regulator having a movable wall controlling a valve at said outlet, a datum pressure system including a by-pass extending around said pump, and opposed expansible chambers separated by said movable wall and connected with said datum system and said fuel line, respectively, whereby said regulator maintains the fuel in said fuel line at a pressure proportional to the pressure in said datum system, the combination therewith of means for establishing a controlled pressure in said datum system at a relative differential with respect to said fuel supply pressure, said means comprising a metering restriction in said by-pass passage, means for regulating the pressure upstream and downstream of said metering restriction, a pressure relief by-pass extending around said metering restriction to the inlet of said pump, means responsive to a pressure rise in said datum system from said established differential pressure for closing the supply of fuel to said datum system and for opening said relief by-pass passage, and means in said datum system for limiting the rate of pressure rise therein.

13. In an engine fuel charging system of the pressure type having a fuel inlet, a fuel outlet for discharging fuel to the engine, a pump supplying fuel under pressure to said inlet, a fuel line normally pressurized from said pump connecting said inlet and said outlet, a pressure regulator having a movable wall controlling a valve at said outlet, a datum pressure system including a by-pass extending around said pump, and opposed expansible chambers separated by said movable wall and connected with said datum system and said fuel line, respectively, whereby said regulator maintains the fuel in said fuel line at a pressure proportional to the pressure in said datum system, the combination therewith of means in said datum system to accommodate fuel displaced by movement of said movable wall during valve opening to increase the fuel supply to the engine, said means comprising a second pressure regulator in said datum system supplied with fuel from said pump and controlling the pressure in said datum system, a datum pressure relief line connecting said second pressure regulator with the intake of said pump, and valve means in said second pressure regulator for closing the supply thereto and opening the relief passage thereof in response to increases in pressure in the datum system beyond the pressure setting of said second pressure regulator.

14. In an engine fuel charging system of the pressure type having a fuel inlet, a fuel outlet for discharging fuel to the engine, a pump supplying fuel under pressure to said inlet, a fuel line normally pressurized from said pump connecting said inlet and said outlet, a pressure regulator having a movable wall controlling a valve at said outlet, a datum pressure system including a by-pass extending around said pump, and opposed expansible chambers separated by said movable wall and connected with said datum system and said fuel line, respectively, whereby said regulator maintains the fuel in said fuel line at a pressure proportional to the pressure in said datum system, the combination therewith of means for establishing a controled pressure in said datum system proportional to the fuel supply pressure comprising a metering restriction in said by-pass passage, means for regulating the pressure upstream and downstream of said metering restriction, a pressure relief by-pass by-passing said metering restriction and extending between said means for regulating the pressure upstream and downstream thereof, means responsive to a pressure rise in said datum system for closing the supply of fuel to said datum system and opening said relief by-pass passage, and a connection between said relief by-pass passage and said downstream regulator operating to communicate upstream pressure thereto to cause a pressure drop downstream of said metering restriction and a decrease in the datum pressure.

15. In an engine fuel charging system of the pressure type having a fuel inlet, a fuel outlet for discharging fuel to the engine, a pump supplying fuel under pressure to said inlet, a fuel line normally pressurized from said pump connecting said inlet and said outlet, a pressure regulator having a movable wall controlling a valve at said outlet, a datum pressure system including a by-pass extending around said pump, and opposed expansible chambers separated by said movable wall and connected with said datum system and said fuel line, respectively, whereby said regulator maintains the fuel in said fuel line at a pressure proportional to the pressure in said datum system, the combination therewith of means for establishing a controlled pressure in said datum system at a substantially fixed differential pressure with respect to the fuel supply pressure, said means comprising a metering restriction adjacent the outlet of said by-pass passage, a second metering restriction of greater capacity adjacent the inlet of said by-pass passage, means for regulating the pressure upstream and downstream of said metering restrictions, a pressure relief by-pass connected between said datum pressure system upstream of said metering restrictions to the inlet of said pump, means responsive to a pressure rise in said datum system for closing the supply of fuel to said datum system and opening said relief by-pass passage, and a connection between said relief by-pass passage and said downstream regulator operating to communicate upstream pressure thereto to cause an increase in pressure drop at said downstream metering restriction and a decrease in datum pressure.

*16. A charge forming device for an internal combustion engine comprising an induction passage, a throttle valve rotatably mounted in said induction passage, an air valve rotatably mounted in said induction passage anteriorly of said throttle valve, a servo device operatively connected to and adapted to control the position of said air valve in accordance with the pressure drop across the air valve, conduit means for supplying fuel to said induction passage, means operatively connected to said air valve for controlling fuel flow through said conduit means, and engine temperature responsive means for varying the*

*degree of opening of said air valve during engine idling conditions.*

References Cited by the Examiner

The following references, cited by the Examiner, are of record in the patented file of this patent or the original patent.

UNITED STATES PATENTS

| | | | |
|---|---|---|---|
| 2,165,447 | 7/39 | Browne | 261—66 |
| 2,447,261 | 8/48 | Mock | 123—119 |

KARL J. ALBRECHT, *Primary Examiner.*

RALPH H. BRAUNER, *Examiner.*